United States Patent [19]

Bellia

[11] 3,990,138

[45] Nov. 9, 1976

[54] DEVICE FOR PLACING A PREFORMED FITTING IN A GROOVE

[75] Inventor: Eugene Sauveur Bellia, Saint-Tropez, France

[73] Assignee: Etat Francais, Paris, France

[22] Filed: Sept. 9, 1974

[21] Appl. No.: 504,236

[30] Foreign Application Priority Data

Sept. 24, 1973 France ............................ 73.34060

[52] U.S. Cl. ...................................... 29/235; 29/451

[51] Int. Cl.$^2$ ........................................ B23P 19/02

[58] Field of Search ...................... 29/450, 451, 235

[56] References Cited

UNITED STATES PATENTS

| | | | |
|---|---|---|---|
| 3,180,015 | 4/1965 | Thompson et al. | 29/235 |
| 3,455,011 | 7/1969 | Harding | 29/235 |
| 3,553,817 | 1/1971 | Lallak | 29/235 |
| 3,605,238 | 9/1971 | Eschholz | 29/235 |
| 3,704,505 | 12/1972 | Lacer | 29/235 |

*Primary Examiner*—Charlie T. Moon
*Attorney, Agent, or Firm*—Larson, Taylor and Hinds

[57] ABSTRACT

A process for placing a preformed fitting in a groove located at the periphery of a bore and a device for use in this process. An obstacle with an external diameter slightly less than the diameter of the bore, is positioned immediately beyond the groove. A fitting, which is kept deformed so that it is circumscribed by a circle of diameter which is at most equal to the diameter of the bore, is introduced into the bore and is brought to a right angle with reference to the groove. The deformation of the fitting is then relieved so that the fitting is introduced into the groove. The invention can be used for manipulation and placing of toric pieces made of deformable plastic material.

10 Claims, 7 Drawing Figures

DEVICE FOR PLACING A PREFORMED FITTING IN A GROOVE

FIELD OF THE INVENTION

The present invention relates to a process for placing a preformed fitting in a groove situated at the periphery of a bore, and a device for use in the process.

BACKGROUND OF THE INVENTION

Processes are already known where the placing of a preformed fitting in a groove is effected manually. For example, among devices used in such processes are tools such as pliers and spatulas. The major drawback of these processes is the risk of deterioration of the preformed fitting or of the piece for which the fitting is intended. Furthermore, manual operations cannot be applied to all cases of environment, temperature, pressure and radiation, or to grooves of all dimensions and depths.

The purpose of the present invention is to alleviate these drawbacks, proposing rapid placement without difficulty in manipulation and without risk of deterioration of the fitting or of the piece that is to receive it.

BRIEF SUMMARY OF THE INVENTION

According to the invention, a cylindrical obstacle with an external diameter slightly less than the diameter of the bore is introduced into the bore, the obstacle being positioned immediately beyond the groove. A fitting, which is kept deformed so that it can be contained within a circle whose diameter is at the most equal to the diameter of said bore is then introduced into the bore. The deformed fitting is then brought to a right angle with the groove and the deformation of the fitting is eliminated, so that the fitting is introduced into the groove.

This process is implemented by a device that comprises a hollow cylindrical body engaged in part in the bore, its external diameter being slightly less than the diameter of the bore, enclosing a sliding piston, a device for holding the fittiing in a deformed position, and an obstacle placed at the end of the hollow body that is engaged in the bore.

One of the advantages of the invention is that a fitting can be placed in a groove, no matter how small or great the distance from the mouth of the bore.

This device comprises, in addition, a removable positioning holder constituted by a sleeve through which the hollow body freely slides, bearing by a shoulder on the rear extremity of the sleeve, whose forward extremity bears around the mouth of the bore. This interchangeable holder allows automatic positioning of the device, no matter what the depth of the groove may be.

The end of the hollow body, which is engaged in the bore, if closed by a plug rigidly connected to a rod whose outer end is bent at a right angle. The hollow body contains a piston, having a central bore in which the rod passes, extending outside the hollow body. The piston has a cut-out that goes straight through it, in which there engages the bent end of the rod. On the outside of the hollow body there is a ring slipped around part of the piston, the ring bearing against the shoulder and presenting a cut-out that corresponds to that of the piston, to allow movement of the bent end. The bent end may thus move along the cut-out between the shoulder and the ring. When the bent end comes into contact with the shoulder, the plug is positioned immediately beyond the groove, so that it constrains the fitting to remain at a right angle to the groove.

The outer end of the piston is extended by a push rod and a compression spring, surrounding the outer part of the piston that is not covered by the ring, is applied to the ring at one end, and to the push rod at the other end. The spring holds the ring against the shoulder and causes the return of the piston, once it has been pushed.

In a second embodiment, the device comprises at least one pin that can slide freely with one end in an obstacle in a bore, and rigidly connected at the other end to the piston, the pin, or pins, holding the fitting in a deformed position. This second embodiment is provided especially for preformed fittings of non circular section that are difficult to twist.

A preferred embodiment has a set of three pins disposed in a triangle, one part of the fitting bending on the other part around two of the pins, the third pin holding the two parts of the fitting bent. Thus, the deformation of the fitting, held crosswise to the bore, is maintained without the fitting thereby being subjected to a parasitic stress. The pins are of unequal length so that when the fitting is to be expanded into the groove, the fitting will be released gradually.

The hollow body is obturated at its outer end by an extension element inside the hollow body, thereby limiting the piston stroke. In addition, two rods are rigidly connected to the obstacle, by their inner end, and each has a notch not far from the other end. The piston and the extension element each have two bores to allow passage of the rods.

The hollow body and the extension element, at the level of the notches, present a cut-out that goes through them, in which there is symmetrically inserted, with reference to the axis, a perforated plate fixed to a leaf spring that surrounds the body at the level of the notches. Each plate has one of the rods passing through it, held in a fixed position by the force of the leaf spring when the notch has penetrated into the plate. This affords the advantage of immobilizing the obstacle immediately beyond the groove and of preventing the fitting from being released outside the groove.

The hollow body, at its end that is engaged in the bore, has a bottom that presents a bore for each of the pins and rods and that limits the piston stroke. This bottom also prevents the fitting from being released outside the groove.

The piston moreover is rigidly connected to a rod that passes in a central bore in said element, ending in a grip. This allows easy manipulation of the piston and thereby manipulation of the pins that are rigidly connected to it.

The result of the invention is a new process and a new device for placing a preformed fitting in a groove situated at the periphery of a bore. This placement is effected without difficulty, by means designed for grooves of various dimensions and with unlimited depths.

The proposed method and device can be used in conditions of temperature, pressure or radiation that differ from the normal. Moreover, the placement does not take much time as compared to the time required to do the operation manually. These advantages further allow automation of the device of the invention.

Other features and advantages of the invention will be better understood in reading the description of two embodiments, with reference to the attached drawings.

DETAILED DESCRIPTION

Figure 1:
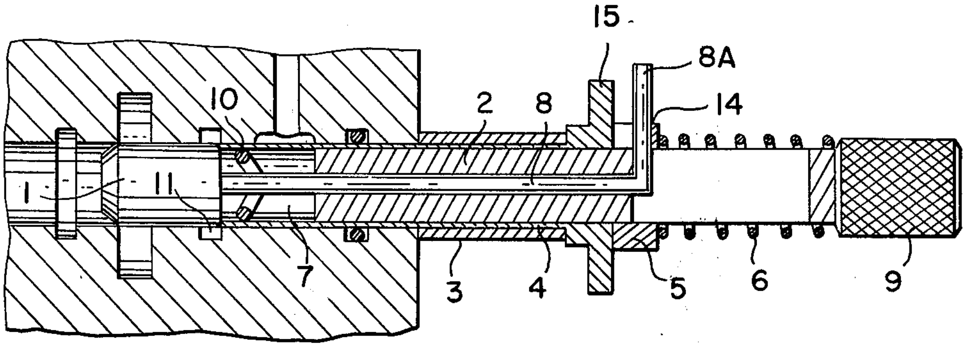
FIG. 1 shows a longitudinal section of the device in a first embodiment, before placing of the fitting.
Figure 2:
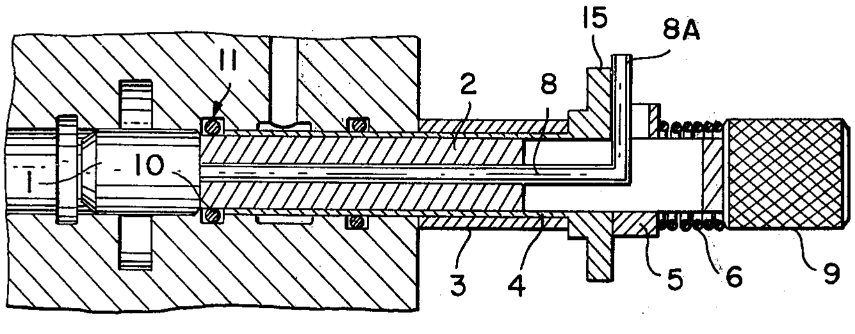
FIG. 2 shows a longitudinal section of the device of FIG. 1 after placing of the fitting.
Figure 3:
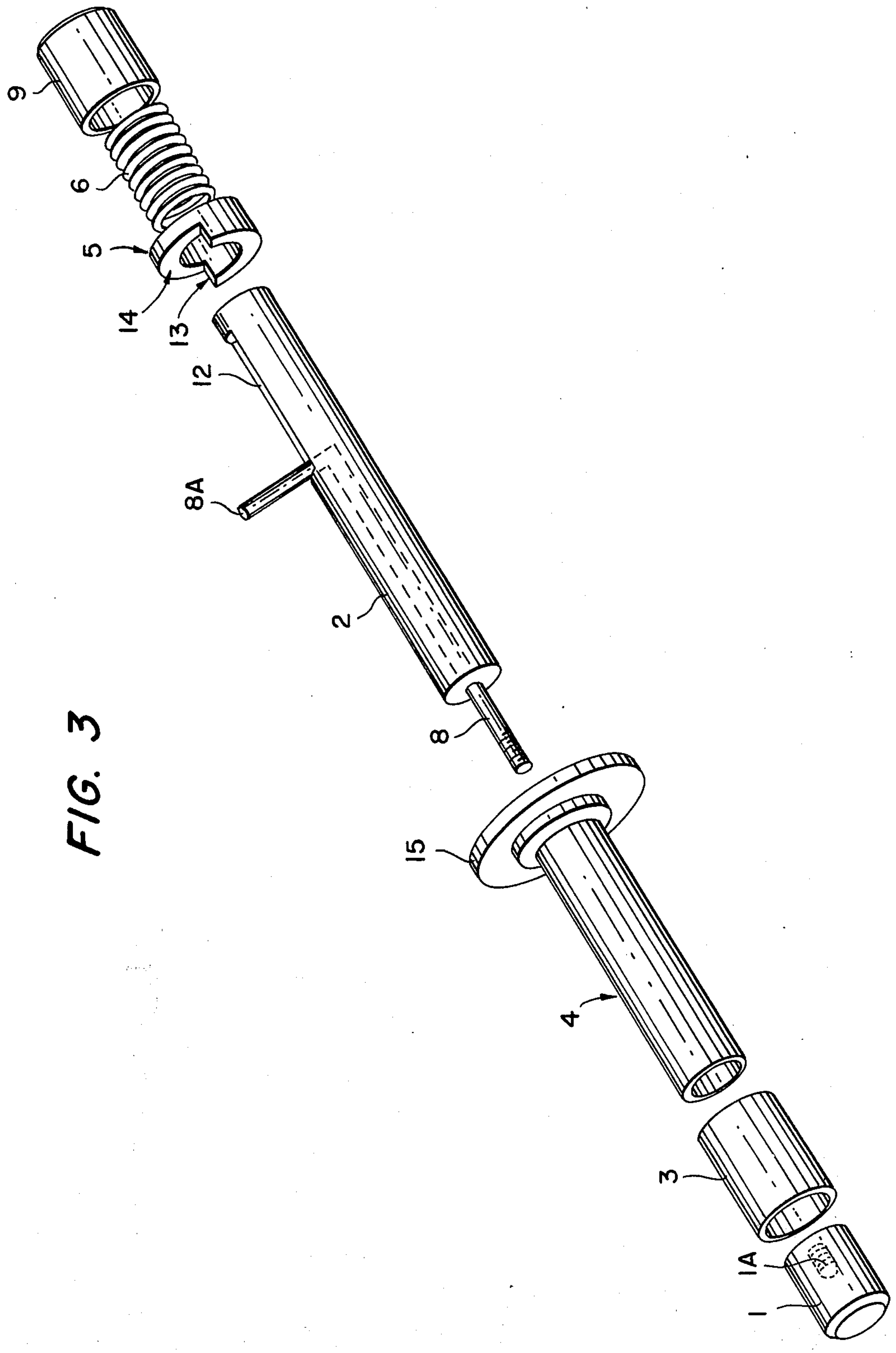
FIG. 3 is an exploded view of the device in a first embodiment.

The first embodiment will be described below with reference to FIGS. 1, 2 and 3.

At one end of the device there is a cylindrical obstacle 1 with a bevel on the part that first penetrates in the bore, which presents a groove 11 where a fitting 10 is to be placed. The external diameter of the obstacle 1 is slightly less than the diameter of the bore. The obstacle 1 has an axial recess 1A in the part opposite the bevelled part. In recess 1A there is screwed the end of a cylindrical rod 8 that is bent at its other end to form a radial tail 8A.

The device further comprises a hollow cylindrical body 4 whose external diameter is slightly less than the diameter of the bore, and whose length is greater than the distance separating the groove from the entrance of the bore. The hollow body has a flange 15 at one end, forming a shoulder.

The hollow body slides freely through a positioning holder 3 constituted by a removable sleeve that can be replaced by another sleeve of the same diameter but of different length, to allow the hollow body 4 to reach the groove 11, by applying the shoulder 15 of the hollow body 4 against the sleeve 3.

In hollow body 4, there slides, with slight clearance, a piston 2 whose length is greater than that of hollow body 4. The piston 2 has an axial bore for passage of rod 8 whose tail 8A issues from piston 2 via a slot 12 that passes from the axial bore to the outside thereof.

Once screwed into the obstacle 1, rod 8 has a length that is equal to the total length of body 4 plus the width of the groove 11. The term "length of the rod" means the smallest distance from the obstacle 1 to the tail 8A.

Opposite its end that penetrates into body 4, piston 2 is connected to a knurled grip 9. The outer part of the piston, between shoulder 15 and knurled grip 9 is covered first by a ring 5 that bears on the shoulder 15 with a recess 13 on the side of tail 8A, and then by a spring 6 that bears on the end of the ring 5 on the one hand and on the knurled grip 9 on the other hand.

The recess 13 extends from one end of ring 5 touching the shoulder 15, to the face 14, over a distance equal to the width of the groove 11 plus the thickness of the rod 8. This implies the possibility of movement on the part of the rod and of the obstacle that is rigidly connected to it, the rest of the device being fixed, over this distance only.

The spring 6 when it is in its inoperative state, tends to urge the piston away from the obstacle 1 as much as possible. The delimitation before the slot 12 is thus against the tail 8A that is halted by face 14 of the ring. Given the length of the rod 8 and the distance between the shoulder 15 and the face 14 which is slightly more than the width of the groove, the obstacle is held like a plug at the forward end of the body 4.

When the piston 2 is pushed by knurled grip 9, the spring 6 is then compressed and the piston 2 advances to the interior of the chamber 7 carrying along with it the fitting 10 that pushes on obstacle 1. The movement of the obstacle 1 is limited by the tail 8A which abuts against the shoulder 15.

To place the fitting 10 in groove 11, there are the following steps:

the rod 8 is unscrewed from the obstacle 1 to place the fitting in deformed position between the walls of the body 4, in chamber 7 and then rod 8 is screwed back into the obstacle 1.

In a variant process, it is provided that fitting 10 is allowed to pass onto the plug to introduce it into chamber 17 without taking rod 8 and the obstacle 1 apart.

a sleeve 3 is placed against the periphery of the bore, through which the obstacle 1 is introduced followed by body 4 containing piston 2 the body 4 bears in turn on sleeve 3 which is of such length that the end of body 4 is immediately ahead of the groove 11 using the grip 9, the piston 2 is pushed, thus driving the fitting from chamber 7 and compressing spring 6 the advance of piston 2 in the body 4 causes the advance of the part containing slot 12; the fitting touches obstacle 1 and piston 2 pushes obstacle 1 immediately beyond the groove 11.

At the same time, the fitting 10 leaves the body 4 and thus because of its elasticity, resumes its original form.

Because of the position of the obstacle 1 immediately beyond the groove 11 and that of piston 2 held immediately before the groove 11 by the knurled grip 9, the fitting 10 is forced to remain in the plane of groove 11 and since it is no longer under constraint it is released into groove 11.

The first embodiment described above is provided more especially for the situation in which the bores are of the diameter of the order of 10 mm and the fittings are of circular section.

A modification of this embodiment provides advanatageously the use of a tube, for body 4, of a thickness of the order of 0.5 mm.

FIGS. 4, 5, 6 and 7 illustrate a second embodiment of the device for placing a fitting 31 in a groove 32.

It comprises the following pieces:

an obstacle 25 whose external diameter is slightly less than the bore diameter. It comprises three bores disposed in a triangle, allowing passage with slight clearance, of three pins 24 of unequal length.

a cylindrical hollow body 21 with external diameter slightly less than the diameter of the bore, one end, being intended to penetrate into the bore, having a bottom 35. Through bottom 35 there slide freely the three pins 24 and two rods 26. The body 21 has a shoulder 33 at a certain distance from the outer end, and between shoulder 33 and the outer end, two symmetrical cutouts 34, which, when seen crosswise, are arcs of a circle.

two rods 26 disposed half way between two of the pins and the third, and disposed at a distance from the wall of the bore that is slightly greater than the width of fitting 31. Each rod 26 is rigidly connected to the obstacle 25 by one end and has, not far from its other end, a notch 27. The assembly is at a distance from obstacle 25 that is equal to the length of the part of body 21 that stops at cutout 34, plus the width of the groove 32.

a positioning holder 29 constituted by a removable sleeve that can be replaced by another holder of the same interior diameter, but of different length, depending upon the depth at which groove 32 that is to be fitted, is located. The front part of the hollow body 21, i.e. the part whereof the end of the hollow body 21 has a bottom 35, can slide freely in the holder on which it bears by its shoulder 33.

a piston 23 sliding with slight clearance in hollow body 21, through which the two rods 26 pass from one side to the other, and which is rigidly connected to the three pins 24. The piston 23 is extended by an axial rod 36 that ends in an external grip 37.

an element 22 that closes the open end of the body 21 and is screwed onto it, extending to the inside of the body 21, the outer diameter of the element being slightly less than the internal diameter of body 21.

The inner end of the element 22 limits the stroke of the piston 23. Part of element 22 has two bores for passage, with slight clearance, of the two rods 26.

Figure 4:
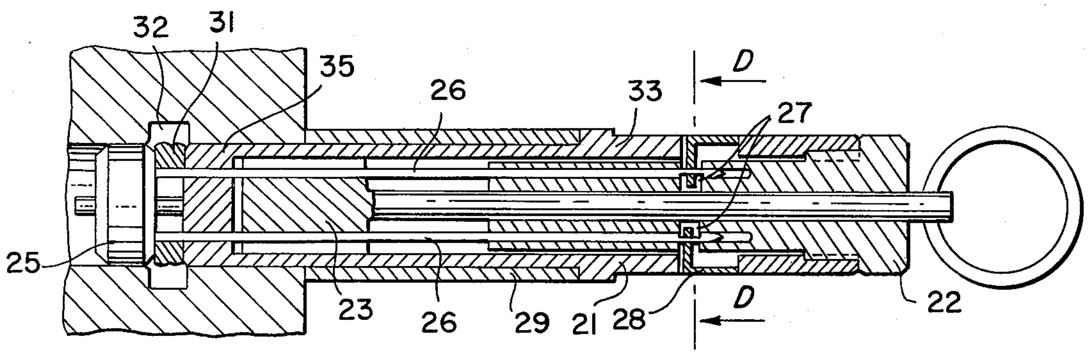
FIG. 4 is a longitudinal section of the device in a second embodiment, along C—C of FIG. 7.
Figure 5:
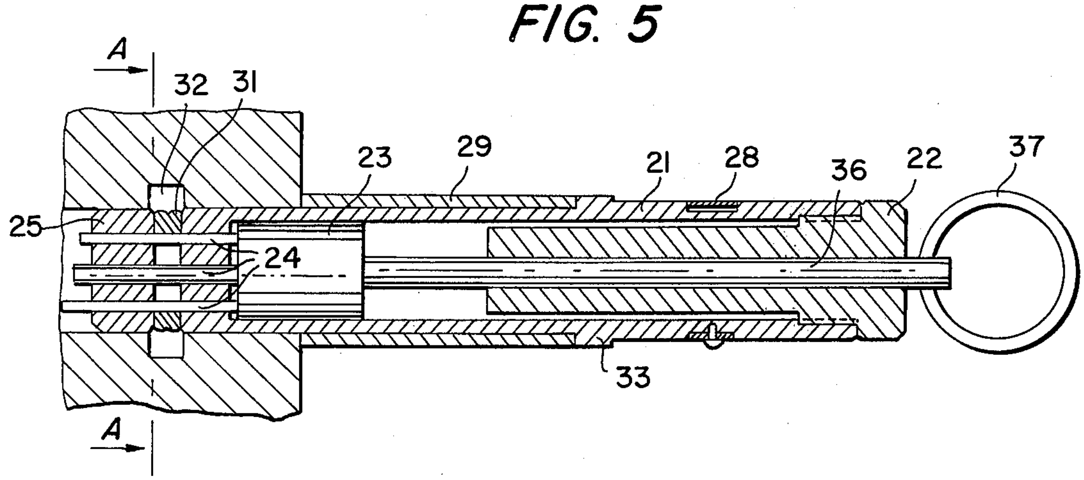
FIG. 5 shows a longitudinal section of the device in a second embodiment, along B—B of FIG. 6.
Figure 6:
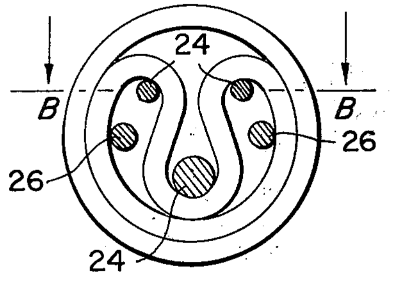
FIG. 6 shows a transverse section along A—A of the device of FIG. 5.
Figure 7:
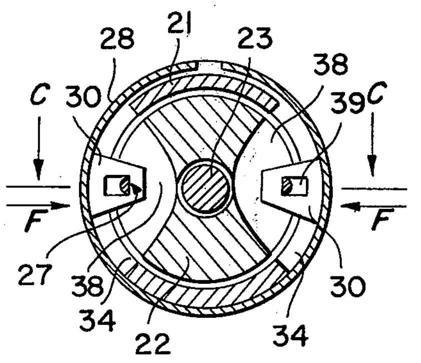
FIG. 7 is a transverse section along D—D of the device of FIG. 4.

As shown in FIG. 7, the cross section along D—D of FIG. 4 indicates the arcuate cutout 38 in the element 22, in continuation of the cutout 34 of the body 21. There are also to be seen two perforated plates 30 which are mutually symmetrical and each disposed in recesses made by cutouts 34 and 38. These plates 30 are fixed to a leaf spring 28 that surrounds the body 21 at the level of cutouts 34 and fixed to the body 21 by any known means.

The performation 39 of the respective plates 30 is here of square section and allows passage of rods 26. When the part of rod 26 that has notch 27 penetrates into the plate 30, plate 30 is drawn toward the peiphery by leaf spring 28 and fixedly holds rod 26, which has the effect of fixing the position of obstacle 25 at a distance from the bottom 35 that is slightly greater than the width of the groove 30.

To disengage the rods 26 and the obstacle 35 from the device, it suffices to bear on leaf spring 28 in the direction of arrows F, which thereby allows the sliding of the rods 26 so as to separate the notch 27 from the plate 30.

The operation of placing the fitting 31 in the groove 32 breaks down into the following stages:

the rods 26 are disengaged as indicated above, and completely withdrawn from the device a holder 29 of suitable length is selected, so that bottom 35 of the body 21 will stop immediately before the groove 32, and it is slid onto the body 21 on the end which has bottom 35 by means of grip 37, the piston 23 is pushed until the three pins 24 appear.

The fitting 31 is then set in place, in a deformed position. One pin holds part of the fitting folded on the others. In folding, the fitting 31 makes a loop about each of the other two pins. The diameter of the circumscribed circle about preformed fitting 31 is less than the diameter of the bore. It is thus possible then to introduce the device with the fitting without risk of deterioration of the fitting by rubbing against the bore wall.

The rods 26 are introduced until the notches 27 penetrate into perforated plates 30. The obstacle 25 is then fixed, immediately beyond groove 32 and separated from the bottom 35 by a distance that is substantially equal to the width of groove 32.

The device is introduced into the bore, the holder 29 coming to bear on the periphery of the bore, on which in turn shoulder 33 of body 21 bears.

The piston 23 is pulled by the grip 37, which pulls with it the three pins 24 which pins because they are of unequal lengths ensure the gradual return of the fitting to its original form. Because of the position of the obstacle 35 immediately beyond the groove 32, fixed with reference to bottom 35 of the body 21, the fitting 31 is seated in the groove 32.

This embodiment is especially suited for placement of preformed fittings of non circular section, since the operation requires no twisting, something that is difficult to manage with such fittings.

Although the invention has been described with respect to exemplary embodiments thereof, it will be understood that variations and modification can be effected in the embodiments without departing from the scope or spirit of the invention.

I claim:

1. A device for placing a peformed fitting in a groove located at the periphery of a bore comprising:

a hollow cylindrical body, said body having an external diameter that is slightly less than the diameter of said bore such that said hollow body is moveable longitudinally within said bore;

a sleeve through which said hollow body freely slides, said hollow body including a shoulder bearing on the rear end of said sleeve, the forward end of said sleeve bearing about the mouth of the bore, thereby positioning said hollow body a predetermined distance within said bore;

a cylindrical obstacle having an external diameter that is slightly less than the diameter of said bore;

means for positioning said obstacle immediately beyond said groove;

means for holding said fitting in a deformed shape comprising at least one pin;

releasing means moveable within said hollow body for releasing said deformation in said fitting, said releasing means being moveable from a first position at which said fitting is held in a deformed shape, to a second position at which said fitting is released from said deformed shape, said fitting being at a right angle with reference to said groove and abutting said obstacle when said releasing means is in said second position, whereby said fitting is released into said groove; and said at least one pin mounted so as to freely slide by one end of a hole in said obstacle and rigidly connected to said releasing means at the other end, said releasing means comprising a piston.

2. A device as claimed in claim 1 comprising three pins, said pins being disposed in a triangle, one part of said fitting bending on the other part of said fitting about two of said pins, said third pin holding the two parts of said fitting in a bent shape.

3. A device as claimed in claim 2 wherein said three pins are of unequal lengths.

4. A device as claimed in claim 1 wherein said hollow body is obturated at its outer end by limiting member that extends to the inside of said hollow body, thereby limiting the stroke of said piston.

5. A device as claimed in claim 1 wherein said obstacle positioning means comprises two rods rigidly connected to said obstacle by their inner ends, each of said rods having a notch a short distance from their other end.

6. A device as claimed in claim 5 wherein said piston and said limiting member each have two bores to permit passage of said two rods.

7. A device as claimed in claim 6 wherein said hollow body and said limiting member have, at the level of said notches, two slots into which are inserted, symmetrically with respect to the axis of said hollow body, two perforated plate fixed to a leaf spring said spring surrounding said hollow body.

8. A device as claimed in claim 7 wherein each of said plates has one of said two rods passing through it, said rod being held fixed in position by said leaf spring when said notch has penetrated into said plate.

9. A device as claimed in claim 8 wherein said hollow body has, at the end thereof that is engaged in said bore, a bottom thereby limiting the stroke of said piston, said bottom having a bore for each of said pins and said rods, thus permitting motion therethrough.

10. A device as claimed in claim 9 wherein said piston is rigidly connected to a rod that passes through a neutral bore in said limiting member, said rod having a grip on the outward end thereof.

* * * * *